United States Patent
Herb

(10) Patent No.: US 7,137,753 B2
(45) Date of Patent: Nov. 21, 2006

(54) ATTACHMENT ELEMENT

(75) Inventor: Armin Herb, Apfeldorf (DE)

(73) Assignee: Hilti Aktiengesellschaft, Schaan (LI)

( * ) Notice: Subject to any disclaimer, the term of this patent is extended or adjusted under 35 U.S.C. 154(b) by 71 days.

(21) Appl. No.: 10/778,703

(22) Filed: Feb. 13, 2004

(65) Prior Publication Data

US 2004/0228681 A1  Nov. 18, 2004

(30) Foreign Application Priority Data

Feb. 15, 2003 (DE) .................. 103 06 354

(51) Int. Cl.
*F16B 3/00* (2006.01)
(52) U.S. Cl. ..................................... 403/348
(58) Field of Classification Search ............... 403/242, 403/252–5, 257, 348, 350–1; 411/45–8, 411/60.3, 349, 360, 549, 551, 501
See application file for complete search history.

(56) References Cited

U.S. PATENT DOCUMENTS

| | | | | |
|---|---|---|---|---|
| 3,082,807 A | * | 3/1963 | Tinnerman | 411/15 |
| 4,575,295 A | * | 3/1986 | Rebentisch | 411/85 |
| 4,757,664 A | * | 7/1988 | Freissle | 52/509 |
| 4,762,437 A | * | 8/1988 | Mitomi | 403/11 |
| 4,830,531 A | * | 5/1989 | Condit et al. | 403/348 |
| 5,201,623 A | * | 4/1993 | Benedetti et al. | 411/48 |
| 6,726,117 B1 | * | 4/2004 | Herb et al. | 238/315 |

FOREIGN PATENT DOCUMENTS

| | | |
|---|---|---|
| DE | 1806087 | 5/1970 |
| DE | 0156223 | 6/2003 |

* cited by examiner

*Primary Examiner*—Daniel P. Stodola
*Assistant Examiner*—Joshua T. Kennedy
(74) *Attorney, Agent, or Firm*—Abelman, Frayne & Schwab

(57) ABSTRACT

An attachment element (1; 31; 51), includes at least one engagement member (7.1; 7.2; 38.1; 55) insertable in a mounting opening (3.1; 3.2; 53) of a hollow body (2.1; 2.2; 41.1; 54) in its first position and engaging holding projections (4.1; 4.2; 40.1; 40.2; 60.1; 60.2) provided on the hollow body (2.1; 2.2; 41.1; 54) in its second position, at least one stop (6; 52) for engaging outer end sides of hollow body rims which limit the mounting opening (3.1; 3.2; 53), and at least one fastening element (8.1; 8.2; 32.1; 32.2; 57) having an expansion body (16.1; 33.1; 59) for laterally displacing the at least one engagement member (7.1; 7.2; 38.1; 55) from the first position thereof to the second position.

8 Claims, 4 Drawing Sheets

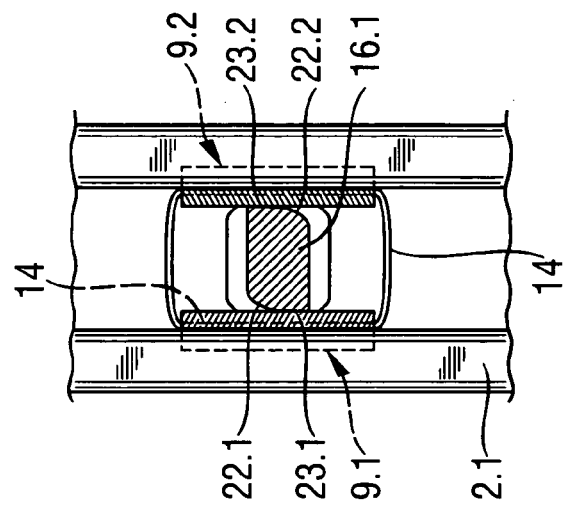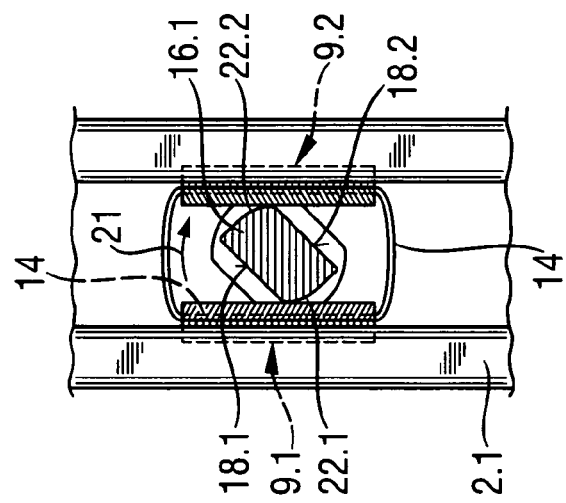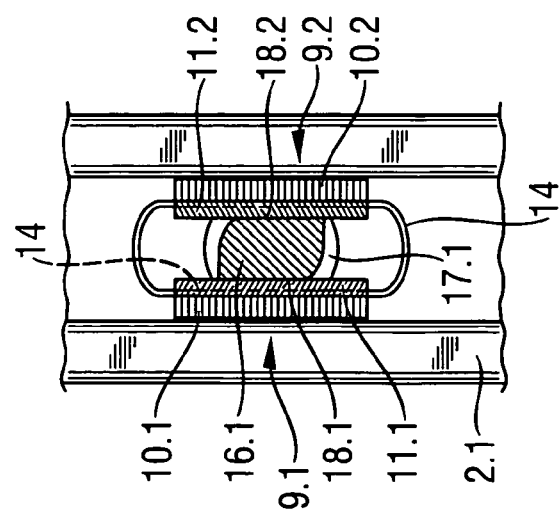

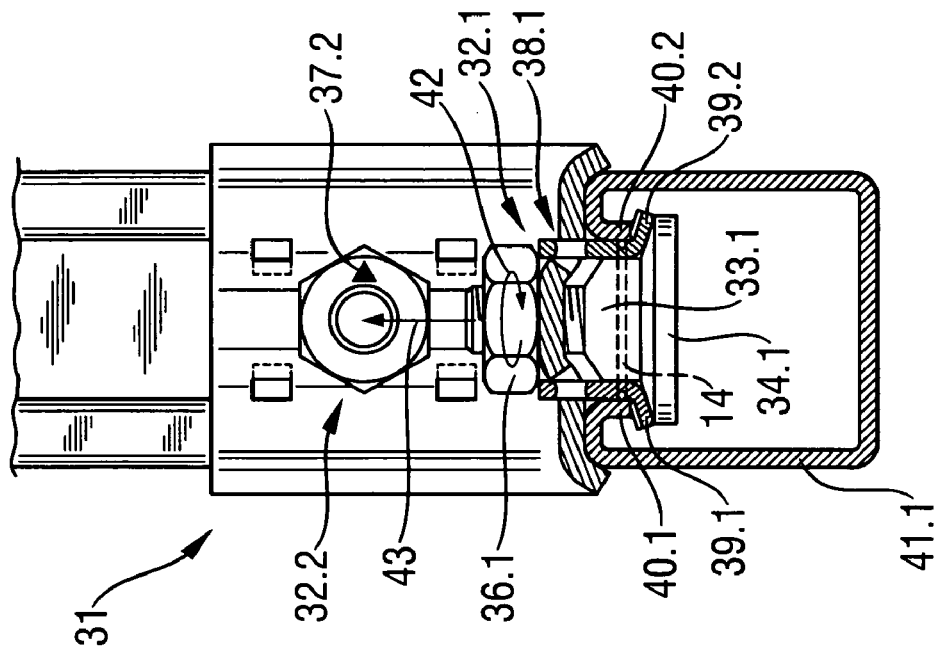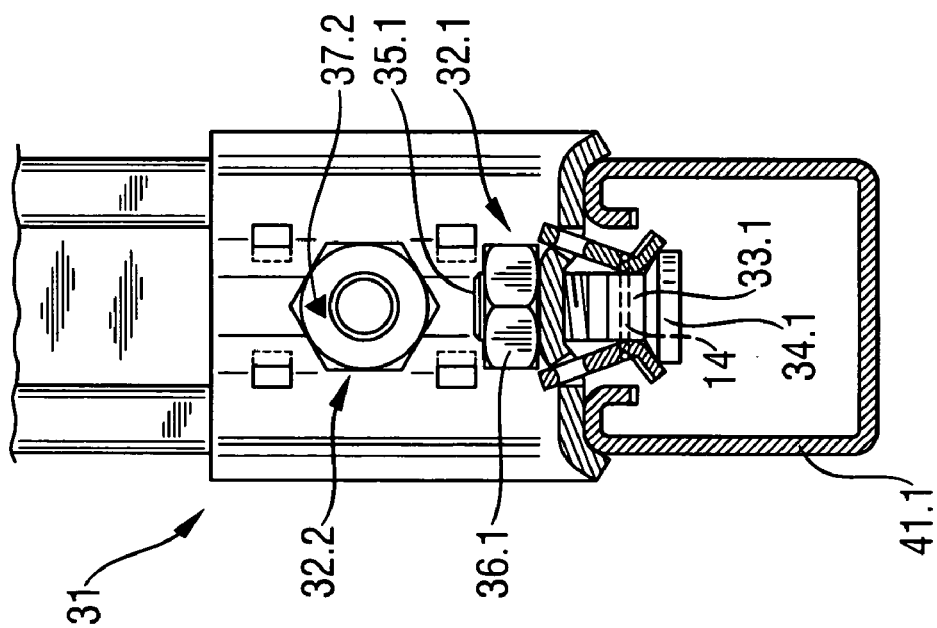

ATTACHMENT ELEMENT

BACKGROUND OF THE INVENTION

1. Field of the Invention

The present invention relates to an attachment element having at least one engagement member insertable in a mounting opening of a hollow body in its first position and engaging holding projections provided on the hollow body in its second position, at least one stop for engaging outer end sides of rims of longitudinal sides of the hollow body which limit the mounting opening, and at least one fastening element which displaces, upon being actuated, the at least one engagement member from its first position to its second position.

2. Description of the Prior Art

Attachment elements of the type described above are used for securing objects, e.g., on a C-shaped mounting rail that can, e.g., be secured on a constructional component. The attachment element is inserted in a mounting opening and, e.g., is pivoted by 90° so that the engagement member of the attachment element engages holding projections provided on the mounting rail. With this preliminary attachment, the attachment element can be displaced in the longitudinal direction of the mounting rail for adjusting the attachment element. In order to finally secure the attachment element on the mounting rail, the engagement member is secured to a stop, e.g., with a threaded rod so that it is clamped to the projections. This type of attachment element is suitable, e.g., for securing elongate objects or a bunch of conduits such as pipes and the like.

From the state of the art, different embodiments of so-called rail nuts are known. E.g., German Publication DE 38 11 974 A1 discloses a spring-biased rail nut having longitudinal grooves in which the rim webs of a C-shaped rail engage in the pivotal position of the nut.

German Publication DE 196 35 632 A1 discloses a rail nut the transverse extension of which is inserted in a slot-shaped opening in a C-shaped profile rail, and the longitudinal extension of which is greater that the inner dimension of the slot-shaped opening so that upon rotation of the nut the nut engages from behind the rims of the slot-shaped opening.

German Patent DE 196 17 750 C1 also discloses a rail nut which is inserted in a mounting opening in a C-shape mounting rail and is the rotated. During a setting process of the nut, it is aligned for engagement from behind the longitudinal edges of the mounting opening by a release member.

German Publication DE 100 52 534A discloses an attachment element insertable in a mounting opening of a hollow body and having a rotatable engagement member for engaging from behind longitudinal edges or rims of the mounting opening. With this attachment element e.g., angles for connecting two mounting rails can be secured on the mounting rails.

The drawback of the known solutions consists in that the length of the contact surface of the engagement member is limited by the slot width of the mounting rail. Thereby, only a limited value of transverse forces can be absorbed by conventional attachment elements. With inclined or vertically extending conduit strands or with axially loaded conduit strands, and in devices for connecting two mounting rails, substantial transverse forces act on the attachment element.

Accordingly, an object of the present invention is to provide an attachment element that insures a reliable connection under action of significant transverse forces.

Another object of the present invention is to provide an attachment member that can be easily inserted in amounting opening of a hollow body at any arbitrary selected location along the longitudinal axis of the hollow body.

SUMMARY OF THE INVENTION

These and other objects of the present invention, which will become apparent hereinafter, are achieved by providing an attachment element including at least one engagement member insertable in a mounting opening of a hollow body in its first position and engaging holding projections provided on the hollow body in its second position, at least one stop for engaging outer end side rims of the longitudinal sides of the hollow body which limit the mounting opening, and at least one fastening element which displaces, upon being actuated, the at least one engagement member from its first position to its second position. The at least one engagement member has at least two strip sections each of which is displaceably supported on the at least one stop. The fastening element has an expansion body for laterally displacing the at least one engagement member from its first position to its second position.

The length of the strip sections can be determined dependent on to-be-absorbed transverse forces. Thus, the length of the strip sections is not determined based on the inner width of the mounting opening of a hollow body, as is the case with conventional attachment elements. In its first position, the at least one engagement member has a width which is smaller than the inner width of the mounting opening of the hollow body. Upon actuation of the fastening element, its expansion body presses the strip sections laterally away from each other in a direction of the holding projections provided in the interior of the hollow body, so that the strip sections engage the holding projections from behind. The inventive attachment element can be displaced along the mounting opening until it reaches a predetermined position before it is secured. After it reaches the predetermined or desired position, the attachment element is secured on the hollow body.

The attachment element can be provided on e.g., a C-shaped mounting rail the rims of which are bent down inward in the region of the mounting opening and form the holding projections for the engagement member. The inventive attachment element can also be arranged on al box-shaped or even plate-shaped component having a suitable mounting opening through which the engagement member can be inserted. The rim regions of the mounting opening are engaged, in the second position of the at least one engagement member, by the strip sections.

At high transverse forces, preferably, two or more strip sections are provided on each side of the engagement member. The attachment element is so formed that either a plurality of strip sections can be laterally displaced, or a plurality of fastening elements is provided on the stop, with each fastening element displacing, upon its actuation, respective two diametrically opposite strip sections from the first position to the second position.

Advantageously, each strip section is pivotally supported on the stop. In this case, the strip sections are brought from their first position to the second position by a pivotal movement of the engagement member. In addition, the strip sections can be supported on the stop with a possibility of lateral displacement.

Advantageously, the at least two strip sections of the engagement member have each a spacing section and an angular section having, optionally, a profile for an improved engagement of the holding-projections in the interior of the hollow body, e.g., of the rim regions. The spacing section of the strip section has an extent that corresponds to the extent of the holding projection, e.g., to the corresponding wall dimension in the setting direction of the attachment element. The angular section serves for engaging, from behind holding projections, e.g., rim regions of the body. The angular section extends at an angle relative to spacing section and in a direction of the engageable holding projections, e.g., engageable rim regions. Preferably, the angle, which is formed by the spacing and angular sections is so selected that the contact surface of the angular sections with the holding projections, e.g., a rim regions, extends in the second position of the strip sections, substantially parallel to the contact surface of the free edges of the holding projections, e.g., rim region.

For a better engagement of the angular section with the holding projection, e.g., with the rim region, the contact surface of the angular section is provided with a special profile, e.g., knurling. Advantageously, the free rim of the holding projection, e.g., the edge region is likewise provided with an appropriate profile, e.g., knurling, so that the knurling of holding projection, e.g., of the rim region, can cooperate with knurling of the angular section. For an optimal engagement of the engagement member with the holding projections, e.g., with the rim regions, the knurling, which is provided on the angular sections, is matched with the knurling on the holding projections, e.g., on the rim regions.

Advantageously, the spacing section has a shorter longitudinal extent than the angular section. In this case, the strip section has, in side view, a substantially T-shaped profile, with the horizontal section of the T-shaped profile forming the angular section and the vertical section of the T-shaped profile forming the spacing section. The free end of the spacing section is displaceably supported on the at least one stop. With such strip sections, the engagement member can be displaced from its first position to its second position by the fastening element, while providing an adequate bearing surface on the angular sections for engaging the holding projections, e.g., rim regions of the hollow body, which permits the attachment element, which is secured on the hollow body, to absorb correspondingly larger transverse forces.

Preferably, the at least two strip sections of the at least one engagement member are held in the first position by a spring member. The spring member can be formed as an annular ring or as a rubber band. The spring member serves, on one hand, as transportation and positioning means that holds the engagement member of the inventive attachment element in the first position in which the engagement member is inserted in the mounting opening of the hollow body. On the other hand, in the second position of the engagement member, the spring member applies a biasing force to the strip sections and which, upon loosening of the fastening element, presses the strip sections toward the expansion body of the fastening element, facilitating repositioning of the inventive attachment element along the mounting opening. Further, the dismounting of the inventive attachment element is facilitated because upon release of the attachment element, the strip sections are urged from the second position to the first position. Advantageously, the biasing force of the spring member is so selected that the strip sections of the engagement member can be easily displaced form the first position to the second position, so that the setting process of the inventive attachment element is not unduly aggravated by a need to overcome a heavy force.

Advantageously, the expansion body of the fastening element has a substantially rectangular cross-section, with at least two diametrically opposite sides of the expansion body being provided with a control profile in the form of an arched surface. The expansion body is formed substantially as an eccentric that laterally displaces the strip sections of the engagement member. When the strip sections are pivotally supported on at least one stop, they are pivoted, upon actuation of the fastening element, relative to the holding projections of the hollow body, with the angular sections being pivoted under the holding projections.

The large initial path of the strip sections of the engagement member is bridged by a traverse extension of the flat cross-sectional profile of the expansion body. Under the action of the arched surfaces of the control profile on the strip sections, a secure seating is achieved by further rotation of the fastening element. The arched surface of the control profile, preferably, does not extend over the entire length of the corresponding side of the cross-sectional profile. By selecting the angle, at which the angular section extends toward the spacing section of the strip section and by appropriately forming the arched surface of the control profile, the tolerances between separate parts of the inventive attachment element and/or of the hollow body can be compensated.

Advantageously, the expansion body of the fastening element has an enlargement of its cross-section at its setting direction end. The enlargement of the expansion body is advantageously formed by a circumferential band. Advantageously, the transition region from the expansion body to its enlargement is formed as, e.g., a cone, preferably, as a truncated cone. With the enlargement portion, the angular sections of the strip sections, upon tightening of the attachment element, are pressed against the free ends of the holding projections, e.g., against the rim regions. Further, the enlargement contributes to the compensation of tolerances of the connection between the attachment element and the hollow body and provides for transmission of additional axial forces to the engagement member and for displaceable support of the strip sections at the at least one stop.

Preferably, the attachment element has, at its end facing in the direction opposite the setting direction, torque transmitting means, e.g., a hexagon. With the torque transmitting means, the attachment element can be easily operated with a simple tool or manually. Advantageously, the hexagon is formed based on metric or inch system. The fastening element can be formed of two parts, with the expansion body being provided at its end facing in a direction opposite the setting direction with an outer thread on which a nut, e.g., a conventional hexagon nut, can be arranged. Thereby, the connection between the inventive attachment element and the hollow body can be additionally axially tighten after a lateral displacement of the strip sections of the engagement member. The nut is secured in its initial position against rotation with a securing lacquer or by being upset. In the first step, upon rotation of the nut, the expansion body also rotates, widening the engagement member. This provides for a preliminary fixing of the attachment element. Upon further rotation of the nut, the connection of the nut with the expansion body is released, and the inventive attachment element is tightened against the hollow body as a result of an axial displacement of the expansion body.

Advantageously, the fastening element is provided with a setting mark, e.g., an optical mark. The setting mark insures a reliable assembly and control of the connection by the user and/or a quality inspector. Advantageously, an optical mark is provided, e.g., on the torque transmitting means at a location visible from outside, e.g., on a bolt end. As an optical mark, e.g., a notch, an engraving, etching, or a color marking in a form of line, circle, or arrow can be used. The user can evaluate a correct alignment of the attachment element by a change in the position of the optical setting mark, e.g., by a change of the original position of the mark by rotating it to 90°, with the changed position corresponding to the position of the inventive fastening element in which it can absorb the loads acting thereon.

Advantageously, the stop is formed as an angle. An angle provides for connection of two hollow bodies, e.g., two C-shaped mounting rails, with one mounting rail being arranged, with its end surface, at an arbitrary location along the mounting opening of the other mounting rail. Advantageously, the angle, as a construction component, is provided with all of the other parts of the attachment element at the working site. With a two-leg angle, e.g., a fastening element with a respective engagement member, which is operated by this fastening element, is provided on each of the legs of the angle.

At least some of parts of the attachment element advantageously are formed of sheet metal by a stamping/bending process. Also, use of plastic materials having suitable properties for forming at least some of the parts of the attachment element is also possible.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 2a a horizontal, with reference to FIG. 1a, cross-sectional view of a first embodiment of an attachment element according to the present invention in the first position of the engagement member;

FIG. 2b a horizontal, with reference to FIG. 1b, cross-sectional view of a first embodiment of an attachment element according to the present invention in the intermediate position of the engagement member;

FIG. 2c a horizontal, with reference to FIG. 1c, cross-sectional view of a first embodiment of an attachment element according to the present invention in the second position of the engagement member;

FIG. 3a a cross-sectional view of a second embodiment of an attachment element according to the present invention in the first position of the engagement member;

FIG. 3b a cross-sectional view of a second embodiment of an attachment element according to the present invention in the second position of the engagement member;

FIG. 5 a cross-sectional view along line V—V in FIG. 4a.

DETAILED DESCRIPTION OF THE PREFERRED EMBODIMENT

Figure 1A:
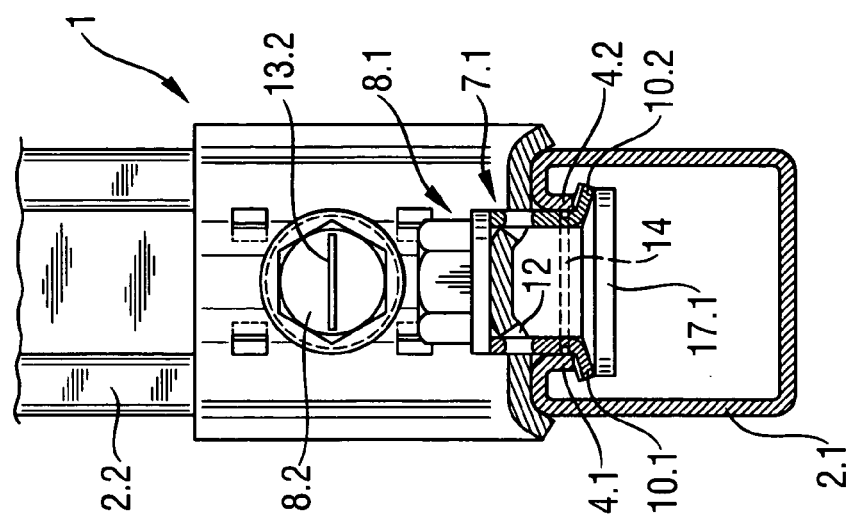
FIG. 1a a cross-sectional view of a first embodiment of an attachment element according to the present invention in the first position of the engagement member.

As discussed above, FIG. 1a shows a cross-sectional view of a first embodiment of an attachment element according to the present invention in a first position of the engagement member, and FIG. 2a shows a horizontal cross-sectional view of the inventive attachment element shown in FIG. 1a in the first position of the engagement member. The inventive attachment element 1 is used for connecting two C-shaped mounting rails 2.1 and 2.2. The mounting rails 2.1 and 2.2 each has a respective mounting opening 3.1, 3.2 provided in a longitudinal outer side of the respective rail 2.1, 2.2 and extending along the longitudinal axis of the respective mounting rail 2.1, 2.2.

The attachment element 1 has a two-leg angle 6 which serves as a stop for engaging outer end sides of rims of the C-shaped mounting rails 2.1, 2.2 and which limit the respective mounting openings 3.1, 3.2. On each leg of the angle 6, there is arranged a respective engagement member, e.g., 7.1 and a respective eccentric bolt 8.1, 8.2 for operating the respective engagement member, e.g., 7.1. The engagement members are pivotally arranged on respective legs of the angle 6.

Below, the construction and the function of the engagement members and eccentric bolts of the attachment element 1 will be discussed with reference to the engagement member 7.1 and the corresponding eccentric bolt 8.1. The second engagement member and the second eccentric bolt 8.2, which are arranged on the second leg of the angle 6, have analogous construction and function. The engagement member has two strip sections 9.1, 9.2. The strip sections 9.1, 9.2 each has an angular section 10.1, 10.2 and a spacing section 11.1, 11.2 The angular sections 10.1, 10.2 each forms with a respective spacing section 11.1, 11.2 an obtuse angle. The free ends of the spacing sections 11.1, 11.2 are inserted in respective openings (e.g., in opening 12) in the angle 6 and pivot about a point of their contact with the rim limiting a respective opening. The length of the spacing sections 11.1, 11.2 is so selected that the angular sections 10.1, 10.2, connected therewith, pivot below the free rims 4.1 and 4.2 of the mounting rail 2.1 and are capable of engaging the same.

The surface of the angular sections 10.1, 10.2, which engages the free rims 4.1 and 4.2 of the mounting rail 2.1 upon tightening of the attachment element 1, is provided with knurling. In order to insure that the connection between the engaging member 7.1 and the free rims 4.1, 4.2 of the mounting rail 2.1 is able to withstand high loads, the free rims 4.1, 4.2 are likewise provided with knurling. Advantageously, both knurling, which engage each other, are adapted to each other.

The bolt head of the eccentric bolt 8;2 and the bolt head of the eccentric bolt 8.1 (not shown in detail) is provided with a setting mark in form of a notch 13.2 that would indicate to the user that the respective engagement member 7.2 or 7.1 is located in the first, so-called insertion position. The engagement member 7.1 is held in the insertion position in which the attachment element 1 is inserted in the mounting rails 2.1 and 2.2 with an annular spring member 14.

The eccentric bolt 8.1 has an expansion body 16.1 which is provided at its end facing in the setting direction with a conical enlargement 17.1. The enlargement 17.1 surrounds the entire expansion body 16.1 and engages from behind the angular sections 10.1 and 10.2 in each position of the eccentric bolt 8.2. In the insertion position, the spacing sections 11.1 and 11.2 of the strip sections 9.1 and 9.2 lie on flat cross-sectional profiles 18.1 and 18.2 of the expansion body 16.1.

Figure 1B:
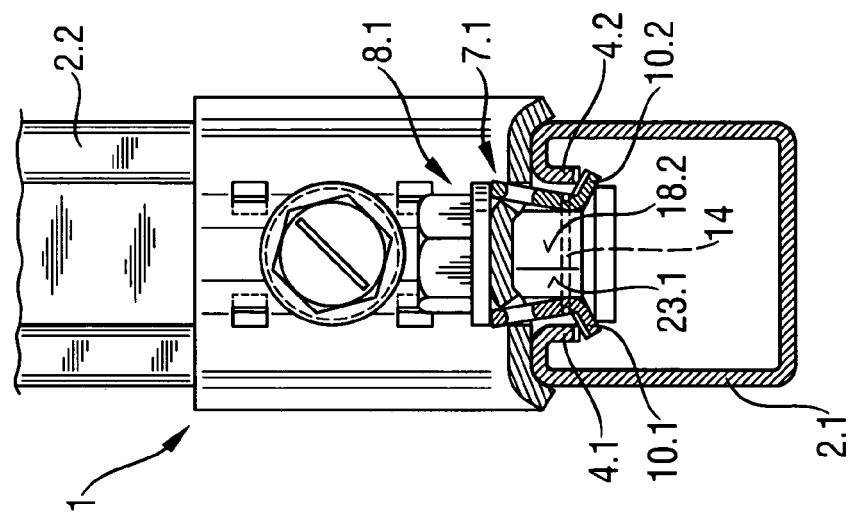
FIG. 1b a cross-sectional view of a first embodiment of an attachment element according to the present invention in the intermediate position of the engagement member.

As discussed above, FIGS. 1*b* and 2*b* show, respectively, a cross-sectional view of the first embodiment of the attachment element in the intermediate position of the engagement member and a horizontal cross-sectional view of the element 1 in the intermediate position of the engagement member. By rotation of eccentric bolt 8.1, e.g., in the clockwise direction (in direction of the arrow 21), the angular sections 10.1 and 10.2 are brought into engagement with the free rims 4.1 and 4.2 of the mounting rail 2.1. This leads to expansion of the spring member 14. The resulting biasing force, which is applied to the strip sections 9.1 and 9.2 provides for repositioning of the attachment element 1 after it has been released.

The large initial path of the lateral displacement of the engaging member 7.1 is bridged over by a side turn of the flat cross-sectional profiles 18.1 and 18.2 of the expansion body 16.1. By a further rotation of the eccentric bolt 8.1 in the direction of the arrow 21 and as a result of action of eccentric arcs 22.1 and 22.2 on the strip sections 9.1. and 9.2, respectively, a fixed seating of the engagement member is achieved.

Figure 1C:
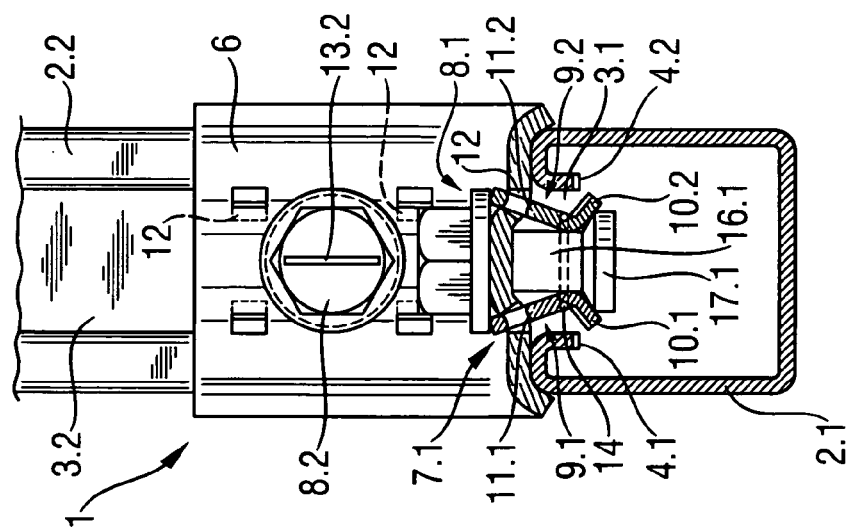
FIG. 1c a cross-sectional view of a first embodiment of an attachment element according to the present invention in the second position of the engagement member.

As discussed above, FIGS. 1*c* and 2*c* show, respectively, a cross-sectional view of the first embodiment of the attachment element in the second position of the engagement member and a horizontal cross-sectional view of the attachment element in the second position of the engagement member. In the second position, the angular sections 10.1 and 10.2 of the engagement member 7.1 are aligned for engagement with the free rims 4.1 and 4.2 of the mounting rail 2.1. The angular sections 10.1 and 10.2 are pressed against the free rims 4.1 and 4.2 by the conical enlargement 17.1. Based on the alignment of the notch 13.2 of the eccentric bolt, the user can determine whether the attachment element 1 is securely mounted on the mounting rail 2.1 and 2.2:

The eccentric arcs 22.1 and 22.2 do not extend over the entire short cross-sectional length of the expansion body 16.1. The surfaces 23.1 and 23.2, which adjoin the respective eccentric arcs 22.1 and 22.2, act as stop and means for preventing over-rotation of the expansion body 16.1. This prevents over-rotation of the eccentric bolt 8.1 and insures the reliability of the attachment element 1.

FIG. 3*a* shows a cross-sectional view of a second embodiment of an attachment element 31 according to the present invention in the first position of the engagement member, and FIG. 3*b* shows a cross-sectional view of a second embodiment of the attachment element 31 according to the present invention in the second position of the engagement member. The attachment element 31, which is shown in FIGS. 3*a*–3*b*, is substantially analogous to the attachment element 1. The eccentric bolts 32.1 and 32.2 are formed of two parts. The eccentric bolt 32.1 has an expansion body 33.1 provided at its end facing in a direction opposite the setting direction, with an outer thread 35.1. A nut 36.1 is screwed on the outer thread 35.1. For rotation of the expansion body 33.1, the nut 36.1 is secured in the initial position with a securing lacquer. On a surface which is provided on the free end of the eccentric bolt 32.2 and which is adjacent to the user, there is provided a setting mark in form of an arrow 37.2

By operating the second nut 36.1, the engagement member 38.1 is pivoted from its first position to its second position. As soon as angular sections 39.1 and 39.2 are aligned for engagement with free rims 40.1 and 40.2 of the mounting rail 41.1; the cross-section of the expansion body 33.1, which is analogous to that of the expansion body 16.1 of the eccentric bolt 8.1 which was described above, prevents further rotation of the eccentric bolt 32.1. This position of the eccentric bolt 32.1 is clearly visible to the user due to the position or alignment of the setting mark, the arrow 37.2 of the eccentric bolt 32.1.

By further rotation of the nut 36.1 in the initial locking direction of the eccentric bolt 32.1, e.g., in the direction of arrow 42, the connection between the nut 36.1 and the expansion body 33.1 is released, and the expansion body 33.1 is lifted in a direction opposite the setting direction of the eccentric bolt 32.1 and shown with arrow 43. With lifting of the expansion body 33.1, the angular sections 39.1 and 39.2 are pressed, additionally to the already obtained locking connection, against the free edges 40.1 and 40.2 of the mounting rail 41.1 with an enlargement 34.1.

Figure 4A:
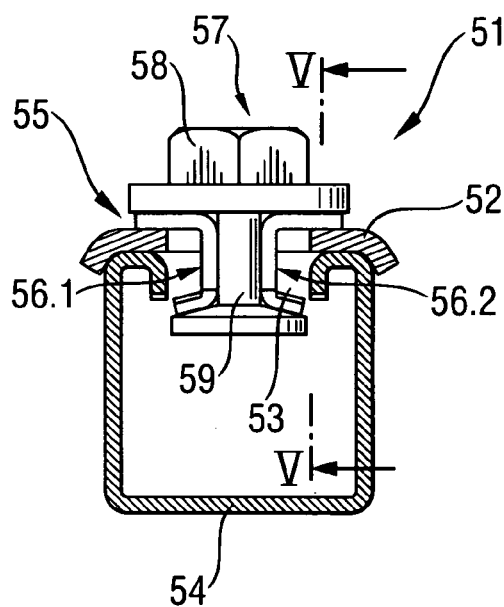
FIG. 4a a cross-sectional view of a third embodiment of an attachment element according to the present invention in the first position of the engagement member.
Figure 4B:
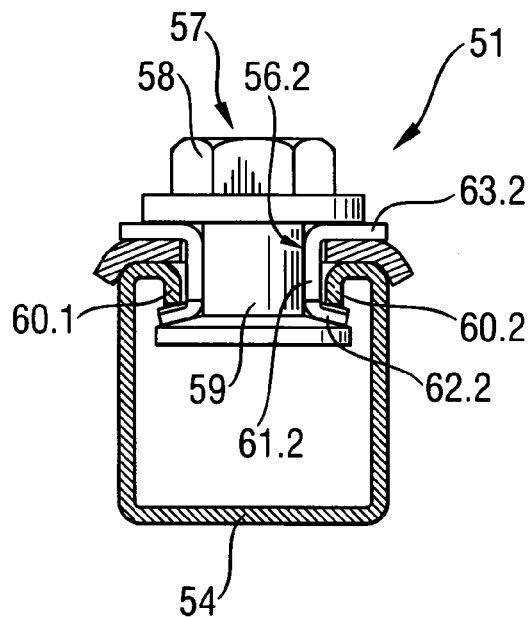
FIG. 4b a cross-sectional view of a third embodiment of an attachment element according to the present invention in the second position of the engagement member.

FIG. 4*a* shows a cross-sectional view of a third embodiment of a attachment element 51 according to the present invention in the first position of the engagement member, and FIG. 4*b* shows a cross-sectional view of a second embodiment of the attachment element 51 according to the present invention in the second position of the engagement member. The attachment element 51, which is shown in FIGS. 4*a*–4*b*, has, instead of an angle, a plate 52 for engaging end surfaces of the rims which limit a mounting opening 53 of the mounting rail 54. The attachment element 51 can serve, e.g., for securing a bunch of conduits-shells on, e.g., the mounting rail 54 which is attached to a constructional component.

The engagement member 55 has two strip sections 56.1 and 56.2 which are supported laterally against the plate 52 and are capable of being displaced laterally relative thereto. By operating a hexagon 58 provided on an eccentric bolt 57, the expansion body 59 is rotated, and the strip sections 56.1 and 56.2 are displaced from the first position to the second position in the direction of free rims 60.1, 60.2 which limit the mounting opening 53.

Figure 5:
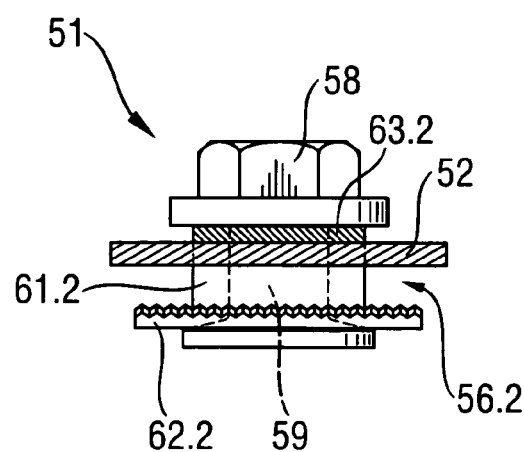

FIG. 5 shows a cross-sectional view of a strip section 56.2 of the engagement member 55 along line V—V in FIG. 4*a*. The strip section 56.2 has a substantially T-shape in front view and a substantially C-shaped cross-section. The horizontal section of the T-shape is formed by an angular section 62.2, and the vertical section of the T-shape is formed by a spacing section 61.2, with the spacing section 61.2 having a smaller longitudinal extent that the angular section 62.2. With reference to the C-shaped cross-section, as shown in FIGS. 4*a*–4*b*, the leg 63.2 which is located opposite the angular section 62.2, of the strip section 56.2 serves for positioning and guiding the strip section 56.2 during its lateral displacement form the first position to the second position.

In summary, there is provided an attachment element which insures a reliable connection even when the attachment element is subjected to transverse load. The inventive attachment element can be inserted at any location of the mounting opening of a hollow body, repositioned along the mounting opening, and secured on the hollow body.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. An attachment element (1; 31; 51), comprising at least one engagement member (7.1; 7.2; 38.1; 55) insertable in a mounting opening (3.1; 3.2; 53) of a hollow body (2.1; 2.2; 41.1; 54) in a first position thereof and engaging holding projections (4.1; 4.2; 40.1; 40.2; 60.1; 60.2) provided on the hollow body (2.1; 2.2; 41.1; 54) in a second position thereof; at least one stop (6; 52) for engaging outer end sides of hollow body rims which limit the mounting opening (3.1; 3.2; 53), the at least one engagement member (7.1, 7.2; 38.1; 55) having at least two separate, diametrically opposing strip sections (9.1; 9.2; 56.1; 56.2); each of which is displaceably supported on the at least one stop (6; 52); and at least one a separate spring member (14) for holding the at least two strip sections (9.1; 9.2) of the at least one engagement member (7.1) in the first position of the at least one engagement member fastening element (8.1; 8.2; 32.1; 32.2; 57) which displaces, upon being actuated, the at least one engagement member (7.1; 7.2; 38.1; 55) from the first position thereof to the second position thereof and which has an expansion body (16.1; 33.1; 59) for laterally displacing the at least one engagement member (7.1; 7.2; 38.1; 55) from the first position thereof to the second position thereof, wherein the expansion body (16.1; 33.1; 59) of the fastening element (8.1; 8.2; 32.1; 32.2; 57) has a substantially rectangular cross-section, and wherein the expansion body (16.1; 33.1; 59) has, on each of at least two opposite sides thereof, a control profile (22.1, 22.2) with an arched surface, wherein the at least two strip sections (9.1; 9.2; 56.2) of the at least one engagement member (7.1; 7.2; 38.1; 55) each has a spacing section (11.1, 11.2) and an angular section (10.1; 10.2; 39.1; 39.2), and wherein the expansion body (16.1; 33.1; 59) has at a setting direction end thereof, a cross-sectional enlargement (17.1; 34.1) for laterally displacing, upon actuation by rotation of the at least one fastening element, the at least two strip sections (9.1; 9.2; 56.2) away from each other, whereby respective angular sections (10.1; 10.2; 39.1; 39.2) engage respective holding projections (4.1; 4.2; 40.1; 40.2; 60.1; 60.2) of the hollow body.

2. An attachment element according to claim 1, wherein each strip section (9.1; 9.2) is pivotally supported on the at least one stop (6).

3. An attachment element according to claim 1, wherein the angular section (10.1; 10.2; 39.1; 39.1) has a profile adapted to engage the holding projections (4.1; 4.2; 40.1; 40.2; 60.1; 60.2) which are provided in an interior of the hollow body.

4. An attachment element according to claim 1, wherein the spacing projection (61.2) has a smaller longitudinal extent than the angular section (62.2).

5. An attachment element according to claim 1, wherein the fastening element (8.1; 8.2; 32.1; 32.2; 57) has, at an end thereof facing in a direction opposite the setting direction, torque transmitting means.

6. An attachment element according to claim 5, wherein the torque transmitting means comprises a hexagon (36.1; 58).

7. An attachment element according to claim 1, wherein the fastening element (8.1; 8.2; 32.1; 32.2; 57) has a setting mark (13.2; 37.2) for determining a position of the attachment element.

8. An attachment element according to claim 1, wherein the stop comprises an angle.

* * * * *